United States Patent [19]

Fritsche et al.

[11] 3,928,158
[45] Dec. 23, 1975

[54] ELECTROFILTER

[75] Inventors: G. Ray Fritsche, Bradford Woods; Leonard W. Haniak, Pittsburgh, both of Pa.

[73] Assignee: Gulf Research & Development Company, Pittsburgh, Pa.

[22] Filed: Aug. 26, 1974

[21] Appl. No.: 500,476

Related U.S. Application Data

[63] Continuation-in-part of Ser. No. 362,036, May 22, 1973, abandoned, which is a continuation of Ser. No. 193,966, Oct. 29, 1971, abandoned.

[52] U.S. Cl. ............................... 204/188; 204/302
[51] Int. Cl.² ............................................. B03C 5/00
[58] Field of Search ........................... 204/186–191, 204/302–308

[56] References Cited
UNITED STATES PATENTS

| | | | |
|---|---|---|---|
| 2,534,907 | 12/1950 | Ham et al. | 204/188 |
| 2,573,967 | 11/1951 | Hamlin | 204/302 |
| 3,394,067 | 7/1968 | Shirley | 204/180 |
| 3,567,619 | 3/1971 | Brown | 204/302 |
| 3,799,855 | 3/1974 | Franse | 204/188 |
| 3,799,856 | 3/1974 | Franse | 204/188 |
| 3,799,857 | 3/1974 | Franse | 204/188 |

FOREIGN PATENTS OR APPLICATIONS

| | | | |
|---|---|---|---|
| 1,008,130 | 10/1965 | United Kingdom | 204/302 |

*Primary Examiner*—T. M. Tufariello

[57] ABSTRACT

A method and apparatus for removing electrically conductive suspended contaminants from high resistivity oils free of significant amounts of dispersed water by flowing the oil through the interstitial spaces defined within a mass of substantially spherical ceramic beads of high electrical resistivity and wherein a high gradient electrostatic field is maintained across the mass.

22 Claims, 1 Drawing Figure

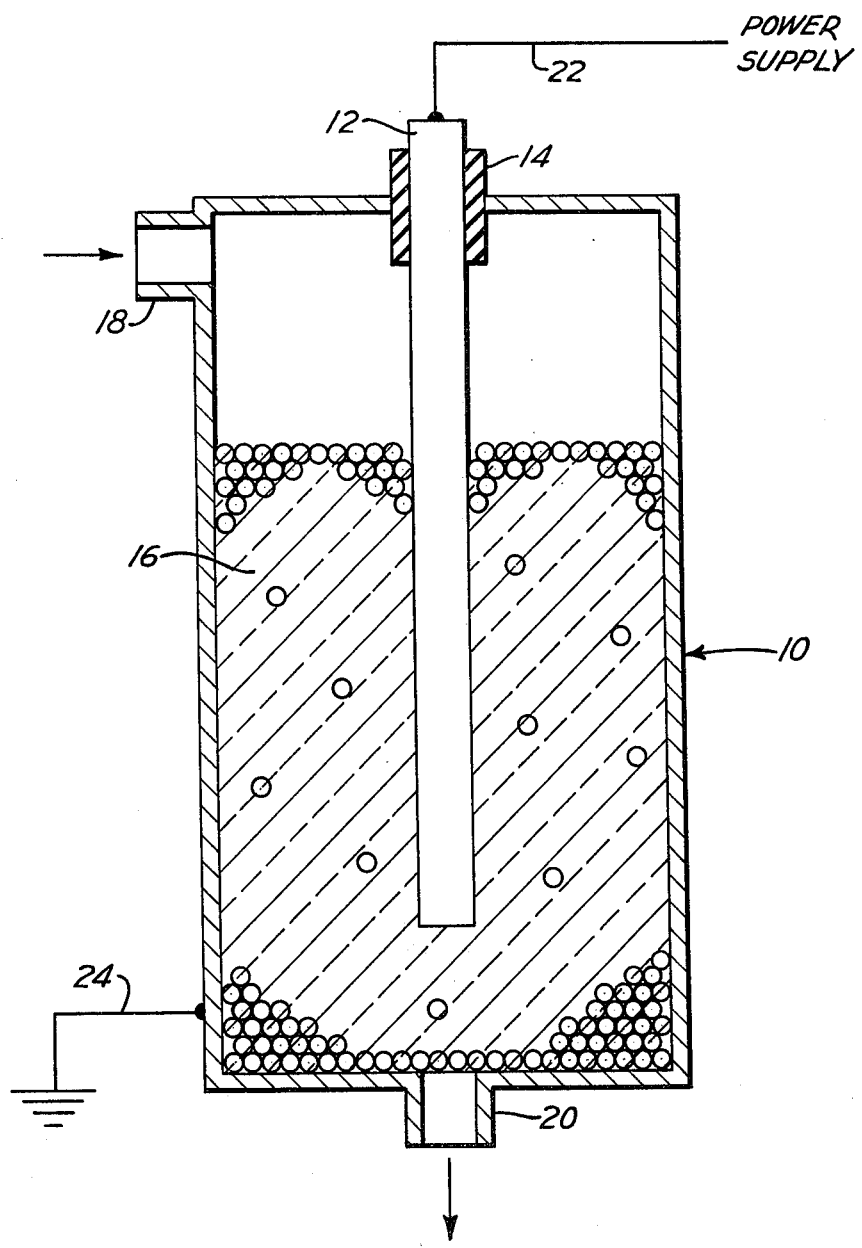

ELECTROFILTER

This application is a continuation-in-part of U.S. Ser. No. 362,036, filed May 22, 1973, now abandoned, which is a continuation of U.S. Ser. No. 193,966, filed Oct. 29, 1971, of G. Ray Fritsche and Leonard W. Haniak, now abandoned.

Our invention is directed to a process and apparatus for removing electrically conductive contaminants suspended in high-resistivity materials, such as hydrocarbon oils. More particularly, our invention is directed to removing such contaminants through the employment of a particular type of aggregate or media maintained in an electrostatic field.

In the petroleum processing industry, it has been recognized that the crude petroleum and various petroleum fractions thereof contain certain minor contaminants in a variety of forms, such as water, water-soluble inorganic salts and various types of solid particulate materials. The undesirability of having these materials present during processing of the crude oil has also been recognized. Various techniques have been proposed in the art for the separation or removal of these contaminants from the desired hydrocarbons. Thus, techniques such as simple fractional distillation and settling are at times effective to remove significant quantities of certain of these contaminants and it is well known in the industry to decant desirable hydrocarbon oil from the traditional BS&W. It has also been proposed to employ mechanical filtering devices for the removal of solid particulate matter from the oil. Additionally, electrical techniques have been suggested as being effective to cause the breakdown of emulsions of the oil and contaminants, such as, for example, water. It has also been suggested to employ electrofiltering techniques for the removal of suspended particulate matter in the oils both with and without some type of media disposed between electrodes.

While each of these techniques is effective to remove significant quantities of contaminants from hydrocarbon streams, the techniques heretofore available are not effective, either alone or in combination, to remove from high temperature refinery streams a sufficient quantity of the total contaminants or certain deleterious contaminants that have a particularly adverse effect upon today's more sophisticated catalytic treating operations. Such contaminants are deposited on catalyst in fixed catalyst beds and eventually plug the beds. It is then necessary to shut down the refinery process and replace with fresh catalyst that portion of the catalyst bed that has become plugged. Settling methods of solid separation generally separate only high-density, comparatively large solid particles and water present in comparatively large globules. Therefore, after settling, such still contaminated oil is usually further subjected to mechanical filtration by various means to remove additional and finer particulate material and at times it is also subjected to an electro treatment to effect breakdown of an oil-water emulsion thereby removing further quantities of water and dissolved salts.

Mechanical filtration techniques are limited in the size of particle they are capable of removing by the size of the openings in the filter (a minimum of about 20 to 25 microns in slotted screens generally used in petroleum filtration). As a practical matter, however, particulate matter tends to build up on mechanical filters and bridge the filter slots as operation continues. This results in a slight increase in the ability of such filters to remove smaller and smaller particles until the filter eventually plugs. Generally, the smallest particle that can be removed in this manner is about 5 microns in size. This still leaves a great deal to be desired since up to 98 percent of the particulate contaminants in most refinery streams are of a size smaller than 5 microns and a major portion of the particles are in the submicron range. Accordingly, some of the best mechanical filters remove only up to about 30 percent of the particulate contaminants over the course of a filter cycle with an average removal rate ranging up to a maximum of about 20 percent.

Electrofilter techniques have been suggested for removal of finely divided particulate matter from hydrocarbon products such as jet fuel delivered from terminals. Typical electrofilters suggested for such use are described in Waterman el al U.S. Pat. No. 3,324,026 and Shirley U.S. Pat. No. 3,394,067. Those filters utilize a porous, nonconducting material such as urethane foam between the electrodes to aid in separation of solid particles from the fluids being filtered. Filters which have a plastic foam between the electrodes cannot be used to filter hot refinery streams of hydrocarbons.

Furthermore, while prior electrofilter techniques have been reasonably effective when dealing with non-conductive contaminants, such as certain metal oxides, a different problem is posed when handling metalliferous and electrically conductive contaminants, such as iron oxides and sulfides. The possible presence of conductive contaminants in products such as jet fuel has discouraged use of electrofilters even for such products at atmospheric temperature. Iron oxides and sulfides are the solid contaminants usually present in the refinery streams that cause most difficulty in plugging fixed beds of catalyst. It will readily be understood that electrofilter techniques tend to lose their efficacy when the contaminant to be removed is electrically conductive because the electrically conductive material forms an electrically conductive film in the filter bed and thereby causes a short circuit which deactivates the high voltage electrofilter mechanism.

Our invention is directed to the removal of suspended, electrically conductive contaminants from hydrocarbon oils. Particularly, our invention resides in a method and apparatus for the removal of such contaminants which are present in the oil in particle sizes of about 5 microns or less, and especially to the removal of particles in the submicron range. In accordance with our invention, a hydrocarbon oil, which as the art is aware, is substantially electrically nonconductive, is flowed through a particulate mass or bed of substantially spherical beads or pellets of high electrical resistivity. The bed of material is arranged with at least point contact between adjacent beads and the interstitial spaces between adjacent beads define a flow path through the mass of beads permitting the passage of the oil through the bed. A high-voltage gradient electrostatic field is maintained across the bed of beads and the liquid to be filtered is passed through the bed between electrodes used to maintain the electrostatic field.

It is believed that the improved performance of the filters utilizing this invention, as shown by long runs before cleaning is necessary, is the result of the contaminants being accumulated at the points of contact of the beads rather than being deposited in the form of a substantially uniform film over the entire surface of the beads. If a continuous film of conductive contaminants is formed between the electrodes of the filter, the filter becomes electrically overloaded, as shown by excessive current or a short circuit. In contrast, accumulation of the contaminants at the points of contact does not form the continuous conductive film between the electrodes and does not overload the filter. It is believed that the accumulation of the contaminants at the points of contact is caused by the electrical resistivity of the beads being higher than the resistivity of the liquid being filtered. Low resistivity beads apparently become polarized in the filter bed with a resultant accumulation of a film of solids over the surface of the beads, thereby causing a short circuit within the filter. Regardless of the theory or mechanism of the filtration that occurs in the filter of this invention, beads having a resistivity higher than the resistivity of the liquid being filtered are essential to long runs before removal of accumulated solids from the filter becomes necessary.

The resistivity of the oil that is filtered may vary widely. For example, a reduced crude may have a resistivity of approximately $1 \times 10^8$ ohm-cm at 275° F., while the resistivity of the bottoms product from a separator following a hydrocracker may be approximately $1 \times 10^{13}$ ohm-cm at the same temperature. Selection of beads that will give best performance of the filter consequently will depend on the petroleum hydrocarbons that are to be passed through the filter. If the filter bed comprises beads of relatively low resistivity glass, for example glass having a resistivity of $1 \times 10^9$ ohm-cm, and the liquid filtered has a high resistivity such as the separator bottoms, effective separation of solids from the separator bottoms is obtained, but it is necessary to backflush the filter frequently to avoid excessive current through the filter bed. A filter bed having suitable resistivity can be prepared by mixing beads having a high resistivity with beads of low resistivity in proportions to give a filter bed effective in filtering a particular nonconducting liquid.

Glass is a preferred material for the beads used in this filter. Beads of glass are readily available as commercial products having resistivities from about $1 \times 10^9$ ohm-cm for soda lime glass up to about $1 \times 10^{15}$ ohm-cm. Other ceramic products also have the necessary high resistivity. For example, beads of mullite, which has a resistivity of approximately $1 \times 10^{15}$ ohm-cm can be used. Porcelains, for example steatite porcelain having a resistivity of approximately $1 \times 10^{14}$ ohm-cm, also can be used. The high electrical resistivity of the beads is essential but is only one of the characteristics of the beads that must be met.

An essential characteristic of the electrofilter is that it be capable of being quickly, thoroughly and repeatedly cleaned of solids accumulated in the filter to recondition the filter for further use. Because the accumulated solids are electrically conductive, the filter will quickly conduct excessive current on being placed back in operation if the accumulated solids are not substantially completely removed from the filter in the filter cleaning operation. Preferably the particles should be quickly and thoroughly cleaned by backflushing a liquid through the filter bed. Such backflushing is accomplished by flowing a nonaqueous liquid upwardly through the filter bed at a rate causing expansion of the filter bed and movement of the beads relative to one another while the voltage gradient, and consequently the electric field, is interrupted. It is essential to rapid and thorough cleaning that the beads be substantially spherical. For example, glass chips and glass rods cannot be thoroughly cleaned by backwashing; consequently, after the initial cycle quickly conduct excessive current when placed back in use after cleaning by backflushing. The term substantially spherical as used herein is used to designate particles that have a roundness and sphericity of at least 0.9 as those terms are defined in Stratigraphy and Sedimentation by Krumbein and Sloss, published in 1954 by W. H. Freeman and Company, San Francisco, California.

The material suitable for the filter media in accordance with our invention, in addition to having a high electrical resistivity, must also be substantially smooth and substantially nondeformable. By substantially smooth, we do not mean that the surface of the individual particles of the media cannot have any surface irregularities whatsoever but rather that the surface areas of such particles are not substantially greater than the theoretical surface area attributable to their substantially spherical shape. Thus, for example, assuming the surface irregularities are to be circular indentations, we consider any surface wherein the depth of the indentations is less than their diameter to be substantially smooth. We prefer, however, to employ materials wherein the depth of the indentations is less than ¾ of the diameter and even less than ½ of the diameter. In the situation of more linear irregularities in the surface, such as, what might be described as a surface "scratch," the depth of such scratch is not to exceed the width of the scratch measured at its narrowest point. Similarly, we prefer to employ materials wherein the depth of the surface irregularities is less than ¾ and even less than ½ the width of such irregularity. Thus, it will be seen that the media employed in our invention can be described as comprising a bed of particles having a smooth surface as distinguished from a rough surface such as would be possessed by highly porous catalyst carriers having surface areas ranging up to several hundred square meters per gram. Illustrative of substantially spherical glass beads suitable for employment as a filter media of our invention are high strength glass beads or pellets of the type employed as a propping agent in the field of oil well production. One such glass propping agent is commercially available under the tradename of UCAR Props.

The importance of a smooth outer surface was illustrated by tests on an electrofilter in which the filter medium was mullite beads of the type used in ball mills for grinding paint pigments. Although the surface appeared to be smooth, examination under a microscope showed the surface to be rough. The filter was quickly shorted and could not be cleaned by backflushing. In contrast, mullite beads treated to have a smooth surface gave runs of satisfactory length and could be cleaned by backflushing. Crazing in the surface of porcelain beads may cause sufficient roughness to prevent their effective use. It is believed that the effect of a rough surface is not only that such a surface provides sheltered niches in which contaminants can be lodged, but also surface irregularities are believed to cause a nonuniform electrostatic field on the surface of the beads and the nonuniform field encourages the accumulation of solids over the surface of the beads other than at points of contact between adjacent beads.

The beads may range in size from a minimum of 1/32 inch in diameter to a maximum of about ¼ inch in diameter. Particles as small as 1/32 inch in diameter can be used when the liquid to be filtered has a low viscosity and the rate of flow through the filter is low. Otherwise, the pressure drop through the bed of beads may be excessive. Beads having a diameter larger than ¼ inch are not as effective in removing solid particles from the nonconductive liquid being filtered and require high backflushing flow rates for effective cleaning. Beads having a diameter of approximately ⅛ inch have been found to be particularly advantageous in the electrostatic filtration of liquids ranging in properties from those of light gas oils to those of reduced crudes.

The individual particles of the media employed in our invention are also to be substantially nondeformable. By non-deformable is meant that there is no appreciable distortion in configuration of the particles under the loads normally encountered in the processing herein. The characteristic is important since it is not desired to increase contact area between the adjacent particles in the media or between the electrode surface and the particles in the media. In this connection, it should be noted that it had been proposed in the electrofilter art to employ highly porous and deformable media which are spongelike in nature, whereby, through the deformation of the media, greater surface contact by the media and electrodes, particularly plate electrodes, is effected and also a certain reduction of the size of the pores passing through the media is effected. Our substantially nondeformable media is not of this latter type.

The nominal or average potential gradient suitable for employment in our invention may vary over a considerable range but can be relatively low compared with gradients employed in prior electrostatic filters. Generally, the gradient employed in our invention will exceed about 5 KV per inch and usually will be in excess of about 7 KV per inch. As will be understood by those skilled in the art, as a general rule, higher potential gradients are employed in the treatment of oils of high dielectric constant or high specific resistance. At times, therefore, employment of potential gradients up to about 15 KV per inch can be required. We do not believe, however, that there is any advantage to be gained by employing potential gradients in excess of about 20 KV per inch and prefer to employ gradients of less than about 12 KV per inch.

Inasmuch as the power supply imposing the high potential gradient across the electrodes is well known in the art and does not constitute a portion of the present invention, it will not be discussed in detail. Suffice it to say, such apparatus usually includes a step-up transformer for AC power and also a rectifier if DC power is desired.

As a general rule, the temperature and pressure maintained within the electrofilter of our invention is immaterial with oil temperatures as low as about −100° F. And ranging up to several hundred °F. being operable and encompassing the temperature ranges normally encountered. The conductivity of most petroleum fractions increases with an increase in temperature. At very high temperatures, the conductivity of the liquid being filtered can prevent operation of the filter. The pressure maintained within the electrofilter system is limited only by the construction of the shell containing the system.

A more important operating condition in the electrofiltering process is the flow rate of the oil to be treated through the mass of particles comprising the media, since the residence time of the oil in the media and the electrostatic field quantitatively affects the removal of the undesired particulate contaminants. Generally, we employ a residence time of at least about 15 seconds and prefer to employ a residence time of at least about 30 seconds. While there does not appear to be any theoretical upper limit regarding residence time and increased residence time would appear to increase contaminant removal, eventually the additional quantity of contaminants removed for an increase in residence time tends to decline substantially. Accordingly, we do not employ a residence time of more than about 10 minutes and prefer to limit residence times to no more than about two minutes.

In order to explain our invention in greater detail, reference is made to the attached drawing showing a simplified cross-sectional view of one embodiment of the apparatus of our invention.

In the drawing there is shown a hollow, cylindrical steel vessel 10 with a cylindrical rod shaped electrode 12 positioned coaxially within vessel 10 and extending through the upper head of vessel 10. Electrode 12 is also insulated from vessel 10 by means of insulating collar 14 which is positioned about the portion of electrode 12 passing through the head of vessel 10. Disposed within vessel 10 and completely filling the annular space defined between the inner wall of vessel 10 and electrode 12 is a mass of substantially spherical, smooth surfaced, glass beads 16. At the upper end of vessel 10 is located an oil input port 18, while at the lower end of vessel 10 is located an oil outlet port 20 thereby permitting flow of contaminated oil from inlet port 18 through vessel 10 and the mass of glass beads disposed therein and permitting removal of oil via outlet port 20. Oil outlet port 20 is connected with lines suitably valved and arranged for backflushing the mass of glass beads with a liquid to recondition the filter for further use.

Electrode 14 is connected to a high voltage power supply by means of conductor 22 while vessel 10 is connected to ground by means of line 24.

In order to illustrate our invention in greater detail, reference is now made to the following example.

EXAMPLE I

In this example, the apparatus employed comprised a vertically disposed 6-inch ID hollow cylindrical steel shell 6 feet long. Positioned coaxially within this shell was a 1-inch diameter steel rod terminating 1 foot above the bottom of the shell. The steel rod was electrically connected to a zero to 50 KV variable transformer through a rectifier, while the steel shell was grounded, thereby providing a DC voltage across the electrodes. The annular space between the steel rod and the inner wall of the steel shell contained beds of various filter media and employed for the treatment of atmospheric tower bottoms containing particulate contaminants varying from about 20 to 30 pounds per 1,000 barrels of oil.

In one series of runs, the filter bed was made up of mill slag. The filter media employed in a second series of runs was river gravel and in a third series of runs the material comprising the filter media was substantially spherical smooth ¼ inch diameter glass beads. The filter media in each series of runs was loaded into the steel shell to a depth of 5 feet thereby leaving an open space 1 foot high within the shell and above the filter bed. Because the 1 inch diameter rod terminated 1 foot above the bottom of the shell, the effective depth of the interelectrode filter bed was 4 feet.

In the first series of runs, the atmospheric tower bottoms was charged to the unit containing mill slag at a rate of about 2 gallons per minute and at a temperature of 250° F. to provide a residence time of about 2 minutes. This particular sample of atmospheric tower bottoms had a solid particulate content of about 30 pounds per thousand barrels. A potential gradient of 37 kilovolts was maintained in the interelectrode space. This operation, although apparently effective to remove certain quantities of the solid contaminants from the oil being treated, resulted in an electrical short circuit after but 15 minutes of operation. Backflushing of the unit was attempted and contaminated oil was once again charged to the unit resulting in an almost immediate electrical short circuit. The mill slag was removed and examination revealed a fine film of black solids collected on the surface of the individual particles, which film could not be removed. A chemical analysis of the solids film indicated the matter to be composed mainly of iron sulfide.

In a second series of runs, the filter media was 4–6 mesh river gravel having a surface which appeared to be smooth to the naked eye. In this series of runs, atmospheric tower bottoms were charged at the rate of 2 gallons a minute and a temperature of 250° F. to provide a residence time of about 2 minutes. This sample of atmospheric tower bottoms also had a solids content of about 30 pounds per 1,000 barrels. The potential gradient across the electrodes was 36 KV.

An initial operation employing the river gravel as filter media resulted in a run lasting only 2 hours before the unit was electrically short circuited. Again, backflushing was attempted but apparently the media could not be successfully cleaned since, upon recharging of the contaminated oil, the unit was electrically short circuited after an extremely short period of time.

The river gravel was removed from the unit and the surface also appeared to be covered with a black film similar to that found on the mill slag. A microscopic examination of the gravel surface revealed areas of porosity having a rough texture which appeared to retain submicron-iron sulfide particles that could not be washed from the gravel.

In the third series of runs, smooth-surfaced glass beads were employed as the particulate media and atmospheric tower bottoms were introduced at the rate of 1.4 gallons per minute at a temperature of 265° F. to provide a residence time of 75 seconds. The sample of atmospheric tower bottoms had a solids content of 23.7 pounds per 1,000 barrels. The potential gradient maintained across the electrodes was 27 kilovolts. This run was conducted for a period of 46 hours and yielded a treated oil containing only 4.9 pounds of particulate solids per 1,000 barrels indicating a solids removal of greater than 80 percent. Subsequently, the glass beads were washed with kerosene and re-employed in the second cycle for the treatment of additional atmospheric tower bottoms. The flow rate employed during the second cycle was 1.5 gallons per minute and the run was maintained for a period of 75 hours without an electrical short circuit. Thereafter, the glass beads were again washed with kerosene and employed in a third cycle treatment of atmospheric tower bottoms for a period of 100 hours without an electrical short circuit. Upon removal from the unit and washing with kerosene, the glass beads appeared to be crystal clear with no noticeable solids film deposited on the surfaces.

EXAMPLE II

In this example, the same apparatus as employed in Example I is used and the shell is filled to the same depth with the ¼ inch glass beads. An atmospheric tower bottoms (about 50 percent reduced crude) similar to that employed in Example I was passed through the bed of glass beads at a flow rate of about 1.4 gallons per minute to provide a residence time of about 75 seconds. In this example, however, an alternating current was applied to the rod electrode by tapping the secondary winding of the step-up transformer in advance of the rectifier. A 15 KV RMS voltage was applied to the rod electrode and the polarity thereof was reversed at 60 cps. Contaminant solids removal is essentially the same as obtained in Example I where a unidirectional field was employed.

It is essential that the filter be capable of being cleaned simply, rapidly and repeatedly to return the filter medium to substantially its initial condition. A series of tests were run in which the filter was subjected to several backflushings. In the first tests, a filter was constructed of a 6-inch diameter cylinder 5 feet long filled to a depth of 24 inches with a mixture of 2 parts by volume 5 to 7 mesh spherical glass beads having a resistivity of approximately $2 \times 10^{14}$ ohm-cm and 1 part by volume 6 to 9 mesh spherical glass beads having a resistivity of $1 \times 10^9$ ohm-cm. A steel electrode extended upwardly from the bottom of the filter to a height of 22 inches. The lower 3 inches of the electrode were covered by a Teflon bushing. The casing of the filter served as one electrode, and the electrode extending upwardly through the filter bed served as the other electrode. A recycle stream taken from the bottom of a separator following a hydrocracking unit, typically having a resistivity of $9 \times 10^{12}$ ohm-cm, was passed downwardly through the filter at a rate of 11 gallons per minute while a direct current voltage was applied between the electrode and the cylinder. The separator bottoms contained 1 to 3 milligrams of the finely divided electrically conductive solids per gallon of oil during normal operation of the hydrocracker. The filter was equipped with electric controls whereby the filter was automatically backflushed when the current through the filter reached 20 milliamperes. The results are set forth in the following Table I. The term "run length" means the time from the end of one backflushing until the electric controls again initiate backflushing.

TABLE I

| Run No. | KV | Backflush Vol. (gpm) | Backflush Time (min.) | Sample Time Into Run (min.) | Run Length (min.) | Solids Removal % | Remarks |
|---|---|---|---|---|---|---|---|
| 1 | 20 | — | — | 25 | — | 88 | |
| 1–1 | 19.5 | 25 | 2 | 230 | 490 | 86.6 | |
| 1–2 | 13 | 25 | 2 | 315 | 325 | 69 | |
| 1–3 | 14 | 25 | 2 | 255 | 270 | 73 | Manually backflushed. |
| 1–4 | 20 | — | — | 120 | — | 87 | |

TABLE I-continued

| Run No. | KV | Backflush Vol. (gpm) | Time (min.) | Sample Time Into Run (min.) | Run Length (min.) | Solids Removal % | Remarks |
|---|---|---|---|---|---|---|---|
| 1-5 | 18 | — | — | 240 | — | 87 | |
| 1-6 | 13.7 | 29 | 2 | 360 | 415 | 80 | |

The procedure described above was repeated, with the exception that the filter was an 8-inch cylinder, 40 inches long, and the hydrocarbon liquid was passed through the filter at a rate of 20 gallons per minute. The filter was filled to a depth of 24 inches with the same glass beads described as for the previous example. A 22 inch electrode extended into the bed of glass beads as described for the 6-inch diameter filter. The results of the test runs on the 8-inch filter are set forth in Table II:

TABLE II

| Run No. | KV | Backflush Vol. (gpm) | Time (min.) | Sample Time Into Run (min.) | Run Length (min.) | Solids Removal % | Remarks |
|---|---|---|---|---|---|---|---|
| 2 | 36.5 | — | — | 10 | — | 92 | |
| 2-1 | " | — | — | 185 | — | 75 | |
| 2-2 | " | 43 | 1 | 335 | 530 | 75 | |
| 2-3 | 35.5 | — | — | 130 | — | 70 | |
| 2-4 | 36 | — | — | 613 | — | 85 | |
| 2-5 | 35.5 | — | — | 783 | — | 63 | |
| 2-6 | 35 | 43 | 1 | 1003 | 2033 | 60 | |
| 2-7 | 36 | — | — | 46 | — | 87 | |
| 2-8 | 35 | 43 | 1 | 375 | 635 | 71 | |
| 2-9 | 35.5 | 43 | 1 | 120 | 315 | 80 | |
| 2-10 | 34 | 43 | 1 | 230 | 245 | 50 | |
| 2-11 | 35.5 | — | — | 48 | — | 97 | |
| 2-12 | 35 | 43 | 1 | 240 | 260 | 45 | Charge to hydrocracking unit changed from heavy distillate to light catalytically cracked oil. |
| 2-13 | " | 43 | 1 | 180 | 300 | 0 | |
| 2-14 | 35.5 | 43 | 1 | 155 | 285 | 57 | Higher current draw experienced when light catalytically cracked oil mixed with heavy distillate. |
| 2-15 | 34.0 | 43 | 1 | 170 | 250 | 79 | |
| 2-16 | 36 | 43 | 1 | 40 | 205 | 96 | |
| 2-17 | 35.5 | 43 | 1 | 175 | 235 | 80 | |
| 2-18 | 34 | 43 | 1 | 180 | 240 | 91 | |
| 2-19 | 35 | 43 | 1 | 51 | 111 | 87 | |
| 2-20 | 35.5 | 43 | 1 | 105 | 120 | 75 | |
| 3 | 21 | 43 | 1 | 250 | 360 | 60 | Reduced voltage for this series of runs. |
| 3-1 | " | 43 | 1 | 300 | 375 | 56 | |
| 3-2 | 19 | 43 | 1 | 280 | 325 | 56 | |
| 3-3 | 23.5 | 43 | 1 | 390 | 470 | 73 | |

It will be noted from Table I that the filter removed over 80 percent of the solids during most of the run and that the filter operated for as much as eight hours between backflushing. That the backflushing effectively cleaned the glass beads and reconditioned them for further use is illustrated by the approximate seven-hour period between the last backflush and the immediately preceding backflush.

In the results presented in Table II of tests on the eight-inch filter, one run over 30 hours in length was made between successive backflushings. The solids removal reported in Run No. 2-13 is believed to be the result of an analytical error as no similar result was obtained in any other test.

Reducing the voltage applied to the filter reduced the solids removal to below 60 percent, as shown in Run Nos. 3, 3-1 and 3-2. However, on increasing the voltage to approximately 6 kilovolts per inch, the solids removal was again increased to over 70 percent of the solids in the liquid being filtered. Inspection of the glass beads at the end of run 3-2, as well as at the end of runs 1-6 and 2-20, showed them to be clean and in essentially their original condition.

The electrostatic filter of this invention is effective in removing very fine, even sub-micron sized, particles of conducting material such as iron oxide or iron sulfide from hydrocarbon liquids even when those particles are in very low concentrations in the range of approximately 1-3 milligrams per gallon. Backflushing the filter by passing a liquid upwardly through the bed quickly reconditions the glass beads, thereby allowing their use through repeated filtering and backflushing cycles without shortening the length of run. Glass granules or particles, other than the substantially spherical particles, for example glass rods or glass chips, are effective in removing the electrically conductive solids for a single run but could not be effectively cleaned by backflushing. With the glass rods, an initial run of 48 minutes before backflushing was obtained, but the second run was only 32 minutes and thereafter the rods could not be cleaned adequately to prevent the controls causing continuous backflush. With glass chips, runs between backflush were less than one-half as long before automatic backflush occurred.

When the filter medium is composed of beads of a material having a resistivity much higher than the liquid being filtered, the filter may not become short circuited even though the run is extended for very long periods. As the run is extended, the separation of the contaminants diminishes. It is desirable then that the backflush-

We claim:

1. A method for removing finely divided suspended solid contaminants including electrically conductive solids from oils having a high resistivity and free of significant amounts of dispersed water which comprises flowing the oil substantially downwardly through interstitial spaces within a particulate bed of substantially spherical nonporous and nondeformable ceramic beads of high electrical resistivity having a smooth outer surface and diameters in the range of about 1/32 inch to about ¼ inch, and maintaining an electrostatic field having a voltage gradient of at least about 5 KV per inch substantially horizontally across said bed during the downward flow of the oil.

2. A method as set forth in claim 1 in which the beads have a resistivity of at least about $1 \times 10^8$ ohm-cm.

3. A method as set forth in claim 1 in which the beads are glass beads.

4. A method as set forth in claim 1 in which the resistivity of the beads is higher than the resistivity of the oil.

5. A method for removing finely divided electrically conductive solid particles from an oil having high resistivity and free of significant amounts of dispersed water which comprises alternately flowing oil downwardly through a particulate bed of nonporous, nondeformable, substantially spherical ceramic beads having a smooth outer surface and diameters in the range of 1/32 inch to ¼ inch between laterally spaced-apart electrodes while maintaining a substantially horizontal voltage gradient of at least about 5 kilovolts per inch between said electrodes, and backflushing a nonaqueous liquid upwardly through the bed at a rate causing expansion of the bed and movement of the beads relative to one another while the voltage gradient is interrupted to remove from the bed solid particles deposited on the glass beads.

6. A method as set forth in claim 1 in which the beads have a smooth outer surface and a Krumbein roundness and sphericity of at least 0.9.

7. A method as set forth in claim 1 in which the electrostatic gradient is unidirectional.

8. A method as set forth in claim 1 in which the direction of the electrostatic gradient alternates.

9. A method as set forth in claim 1 in which the rate of flow of the oil through the bed of beads provides a time in the bed of beads of at least 15 seconds.

10. A method as set forth in claim 1 in which the temperature of the oil flowing through the bed of beads is in the range of −100° F. to several hundred degrees Fahrenheit.

11. A system for removing finely divided electrically conductive suspended solid contaminants from high resistivity oils comprising a casing having an inlet and an outlet, a particulate bed of substantially spherical nonporous and nondeformable ceramic beads having a high resistivity, diameters in the range of 1/32 inch to about ¼ inch and a smooth surface supported in the casing, laterally spaced-apart electrodes engaging said particulate bed, means for flowing the high-resistivity oil from the inlet through the particulate bed between the electrodes to the outlet, means for maintaining a voltage gradient of at least 5 kilovolts per inch between the electrodes, means for flowing a nonaqueous liquid upwardly through the filter at a rate causing expansion of the bed and movement of the beads relative to one another to remove precipitated solids from the bed, and means for alternating flow of the high-resistivity oil through the bed and flow of the nonaqueous liquid upwardly through the bed and for interrupting the voltage gradient during the period of upward flow.

12. A system as set forth in claim 11 in which the means for flowing the oil through the bed of beads directs the oil downwardly through the bed and the electrodes are spaced horizontally apart.

13. A system as set forth in claim 12 in which the beads are glass.

14. A filter for removing finely divided electrically conductive suspended solid contaminants from high-resistivity oils comprising a vertical cylindrical casing of an electrically conductive material, a particulate bed of substantially spherical nonporous and nondeformable ceramic beads of high resistivity having a smooth outer surface and a maximum diameter of ¼ inch within the casing, inlet means for delivering the oil to be filtered into the casing above the bed, an outlet at the lower end of the casing for discharging filtered oil from the filter, a centrally located electrode extending vertically through the bed of beads, and means for maintaining a voltage gradient of at least about 5 KV per inch between the electrode and the cylindrical casing.

15. A filter as set forth in claim 14 in which the beads are glass.

16. A method as set forth in claim 5 in which the ceramic beads are glass beads.

17. A method as set forth in claim 5 in which the ceramic beads are glass beads having a resistivity of at least about $1 \times 10^8$ ohm-cm.

18. A system as set forth in claim 13 in which the glass beads have a resistivity of at least $1 \times 10^8$ ohm-cm.

19. A filter as set forth in claim 14 in which the beads are soda-lime glass.

20. A filter as set forth in claim 15 in which the glass beads comprise a mixture of beads having a resistivity ranging from approximately $1 \times 10^9$ ohm-cm to approximately $2 \times 10^{14}$ ohm-cm.

21. A filter for removing finely divided electrically conductive solid particles from high-resistivity liquids comprising a cylindrical casing having an inlet and an outlet, a particulate bed of substantially nonporous and nondeformable spherical ceramic beads of high electrical resistivity having a smooth outer surface and a maximum diameter of ¼ inch within the casing between the inlet and outlet thereof, a first electrode centrally located and extending vertically downwardly into engagement with the particulate bed, a second electrode laterally spaced from and surrounding the first electrode and engaging the particulate bed, and means for maintaining a voltage gradient of at least about 5 KV per inch between the two electrodes.

22. A method for removing finely divided solid particles having a diameter less than 5 microns from a liquid having a high resistivity and free of significant amounts of dispersed water which comprises flowing the liquid in a direction other than upwardly through a particulate bed of nonporous, nondeformable ceramic beads having a high resistivity, a smooth outer surface and diameters in the range of about 1/32 inch to about ¼ inch between spaced-apart electrodes in contact with the particulate bed, maintaining a voltage gradient of at least about 5 KV per inch between said electrodes during the flow of the liquid of high resistivity, periodically interrupting the voltage gradient between the electrodes and the flow of liquid through the particulate bed, and while the flow of liquid of high resistivity and the voltage gradient are interrupted flowing a non- aqueous backflushing liquid upwardly through the particulate bed at a rate causing expansion of the particulate bed and movement of the beads relative to one another to remove solids deposited on the beads.

* * * * *

UNITED STATES PATENT OFFICE
CERTIFICATE OF CORRECTION

PATENT NO. : 3,928,158

DATED : December 23, 1975

INVENTOR(S) : G. Ray Fritsche and Leonard W. Haniak

It is certified that error appears in the above-identified patent and that said Letters Patent are hereby corrected as shown below:

Column 5, line 20, "had" should be --has--.

Column 5, line 55, "And" should be --and--.

Column 12, line 53, cancel "downwardly".

Signed and Sealed this thirtieth Day of March 1976

[SEAL]

Attest:

RUTH C. MASON
*Attesting Officer*

C. MARSHALL DANN
*Commissioner of Patents and Trademarks*